(12) United States Patent  
Lassota

(10) Patent No.: US 8,690,088 B1
(45) Date of Patent: Apr. 8, 2014

(54) FOOD GRINDER WITH AUTOMATIC HOPPER COVER AND TOOLESS DISASSEMBLY

(75) Inventor: Zbigniew G. Lassota, Long Grove, IL (US)

(73) Assignee: Food Equipment Technologies Company, Inc., Lake Zurich, IL (US)

( * ) Notice: Subject to any disclaimer, the term of this patent is extended or adjusted under 35 U.S.C. 154(b) by 0 days.

(21) Appl. No.: 13/598,079

(22) Filed: Aug. 29, 2012

Related U.S. Application Data

(62) Division of application No. 13/006,994, filed on Jan. 14, 2011, now Pat. No. 8,256,696, which is a division of application No. 12/201,161, filed on Aug. 29, 2008, now Pat. No. 7,874,505.

(60) Provisional application No. 60/988,898, filed on Nov. 19, 2007, provisional application No. 60/998,350, filed on Oct. 10, 2007, provisional application No. 60/967,299, filed on Aug. 31, 2007.

(51) Int. Cl.
*A47J 42/56* (2006.01)

(52) U.S. Cl.
USPC .............................. 241/36; 241/37.5; 241/100

(58) Field of Classification Search
USPC .................... 241/36, 37.5, 282.1, 282.2, 100
See application file for complete search history.

(56) References Cited

U.S. PATENT DOCUMENTS

| 7,252,252 B2 * | 8/2007 | Mauch et al. | 241/92 |
| 2004/0025703 A1 * | 2/2004 | Ming | 99/286 |

FOREIGN PATENT DOCUMENTS

DE 2850724 A1 * 4/1980

* cited by examiner

*Primary Examiner* — Mark Rosenbaum
(74) *Attorney, Agent, or Firm* — James W. Potthast; Potthast & Associates

(57) ABSTRACT

A food ingredient grinder (30) having a grinding chamber (158) with an electrically powered grinding mechanism (130, 150, 154) has an ingredient hopper has a pivotally mounted cover (57) that is automatically moved between open and closed positions and a controller (202, 204, 208) responsive to a cover position sensor (81,82) failing to sense the cover in a closed position disables a start switch (212) from starting a grinding operation. The grinding chamber (156) is toolessly mounted to the top of a frame member (96) of the grinder to facilitate removal of the chamber for cleaning or replacement.

11 Claims, 14 Drawing Sheets

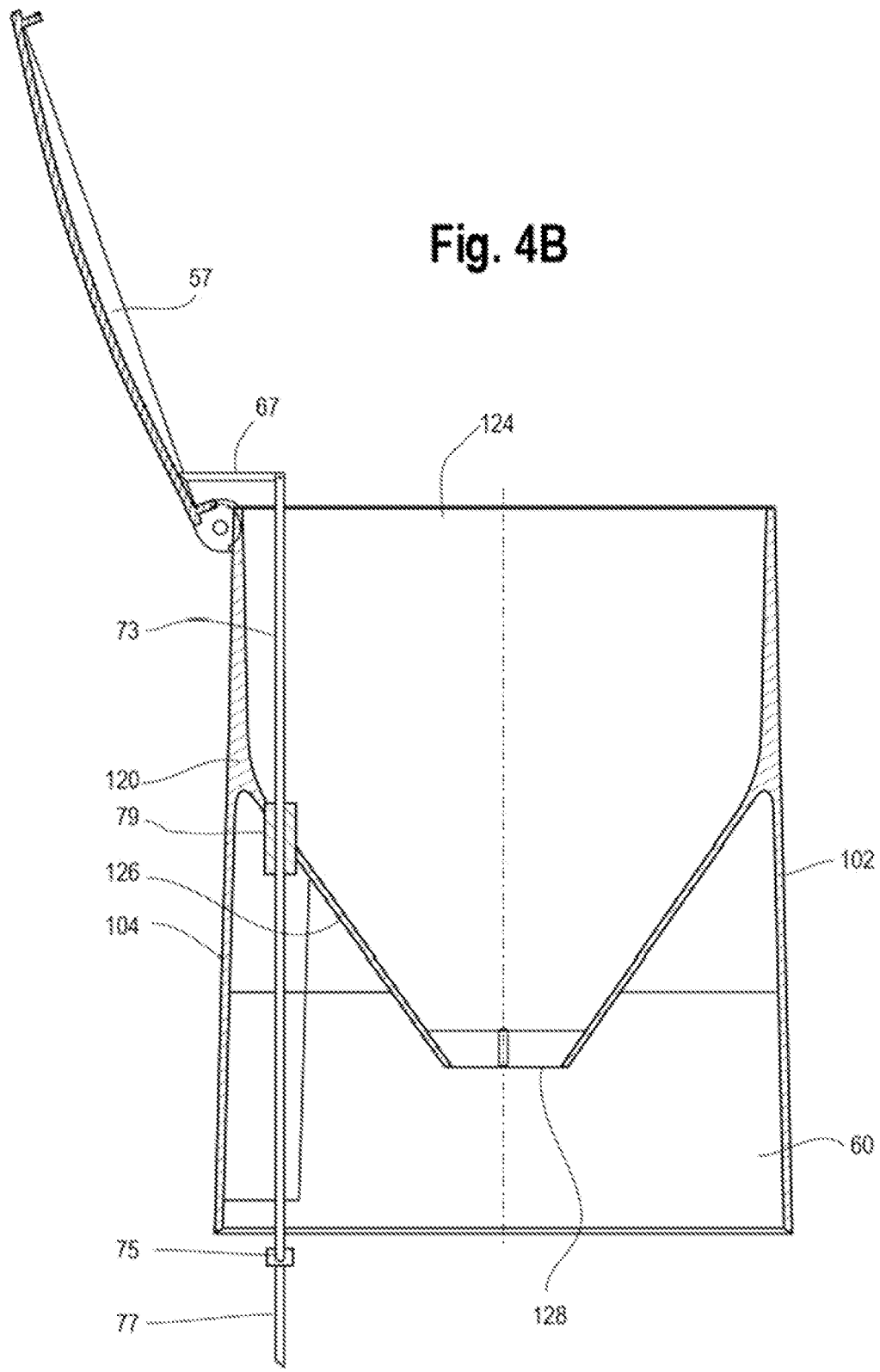

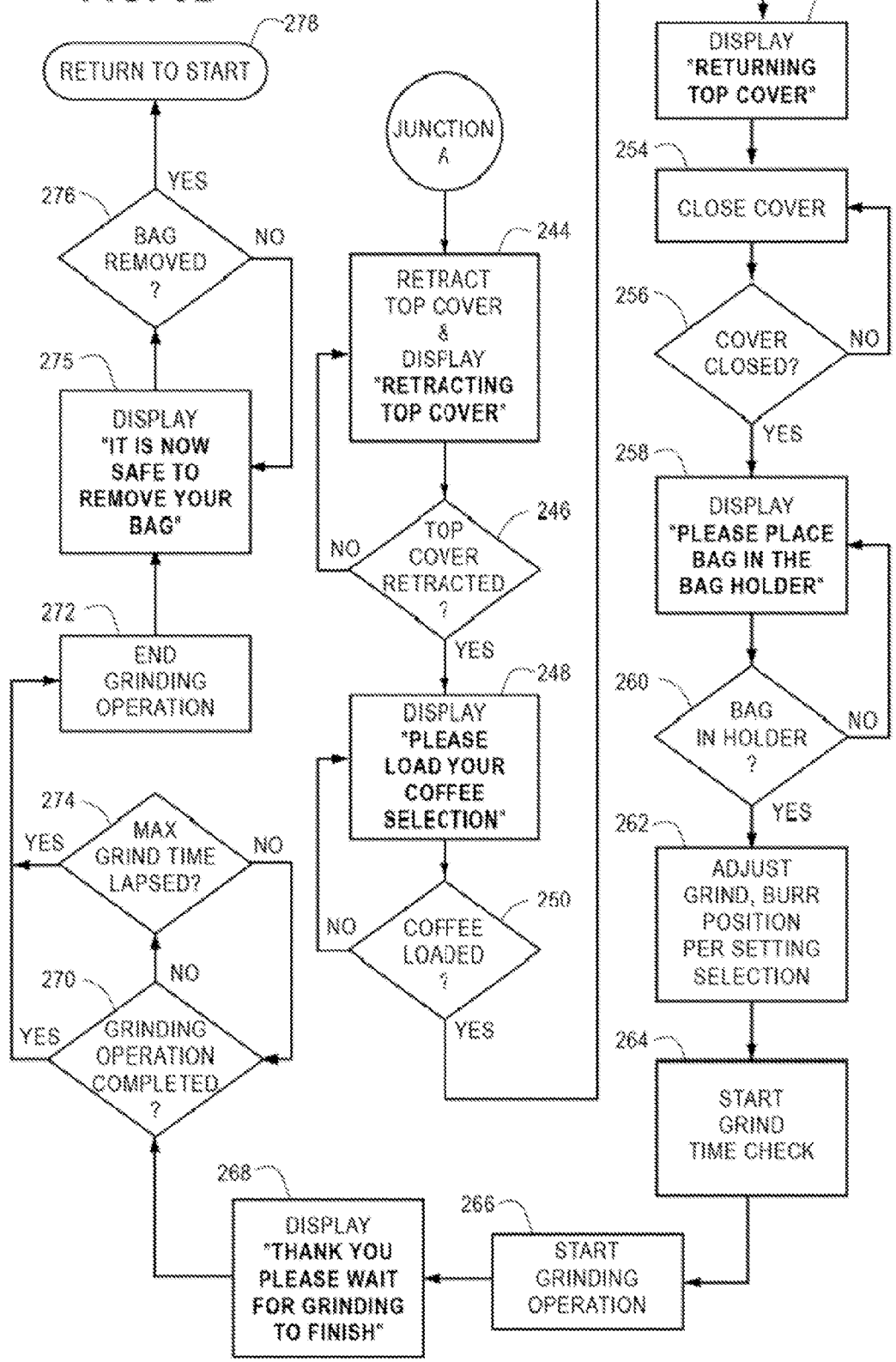

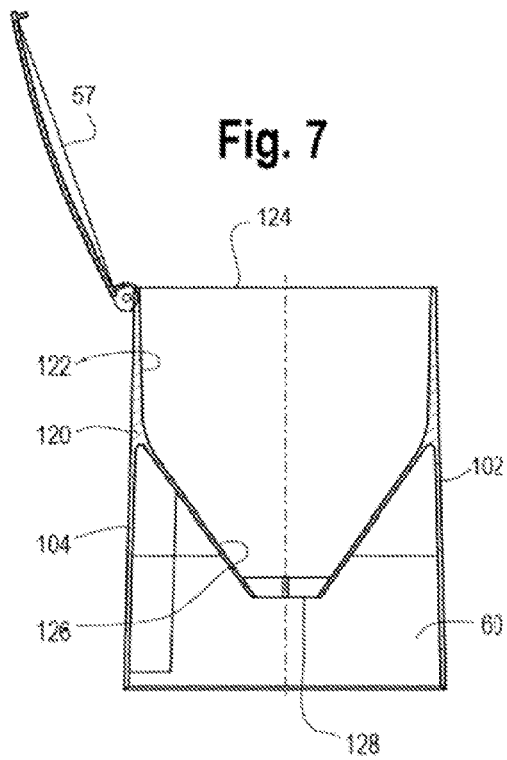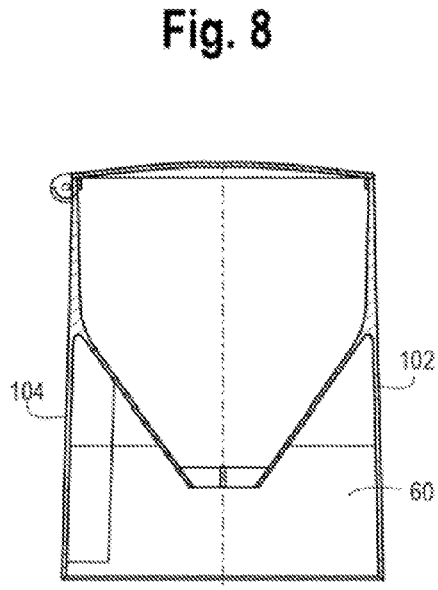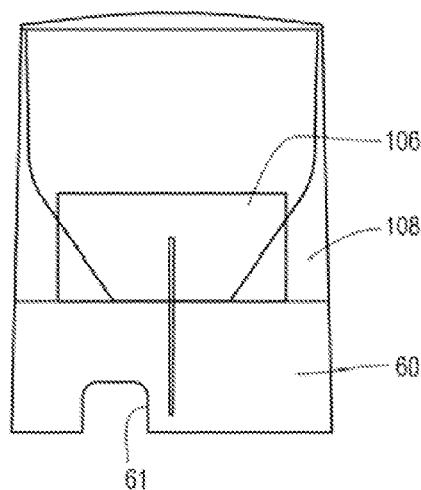

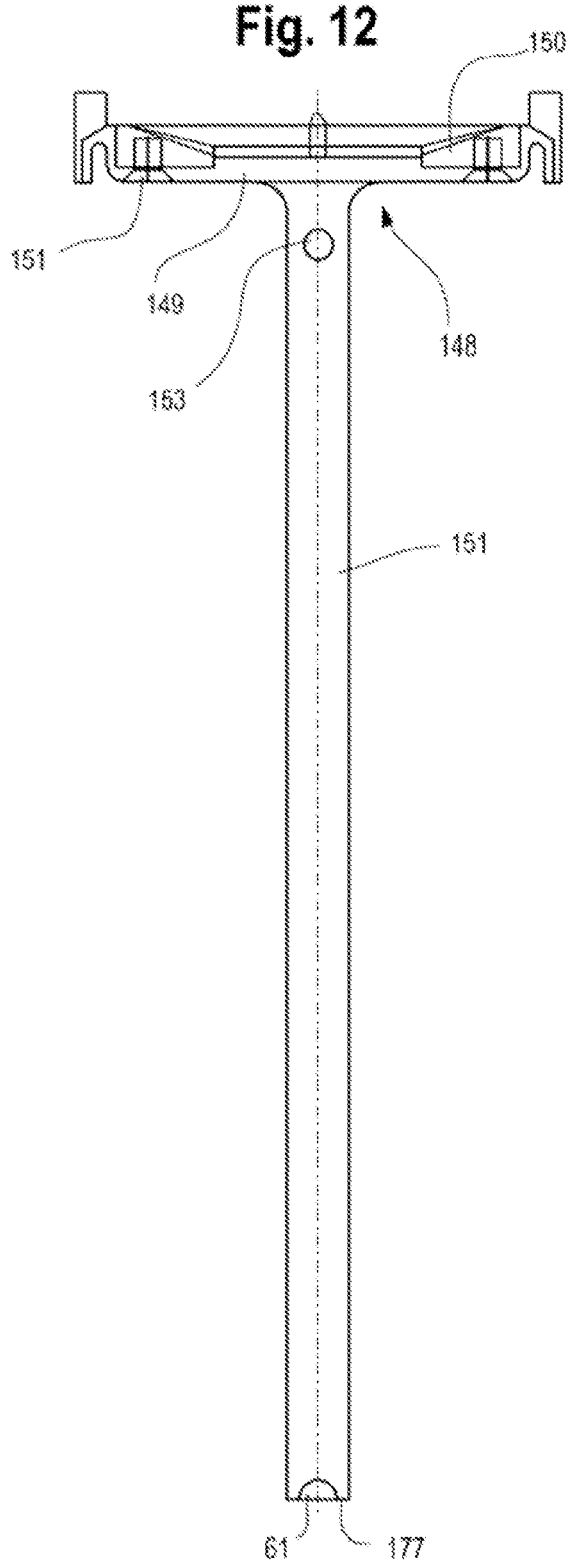

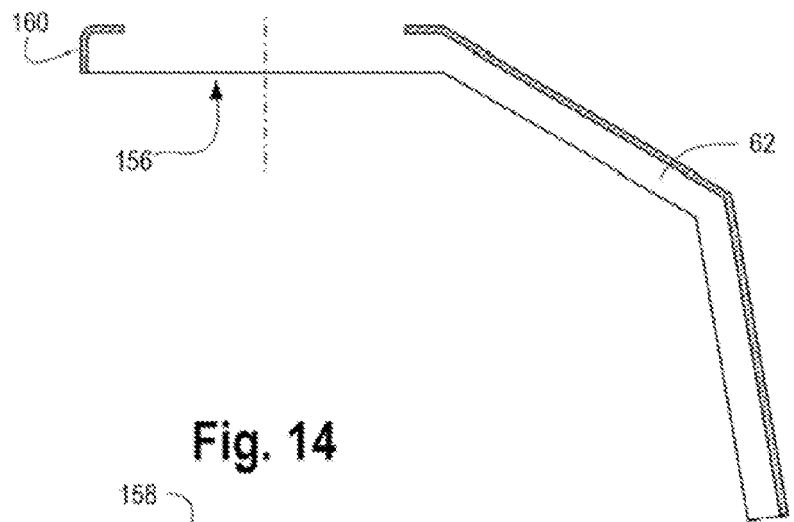
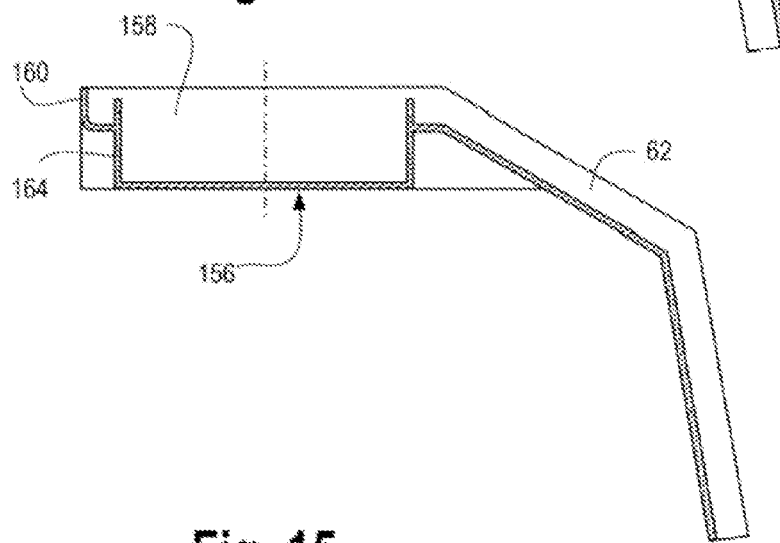
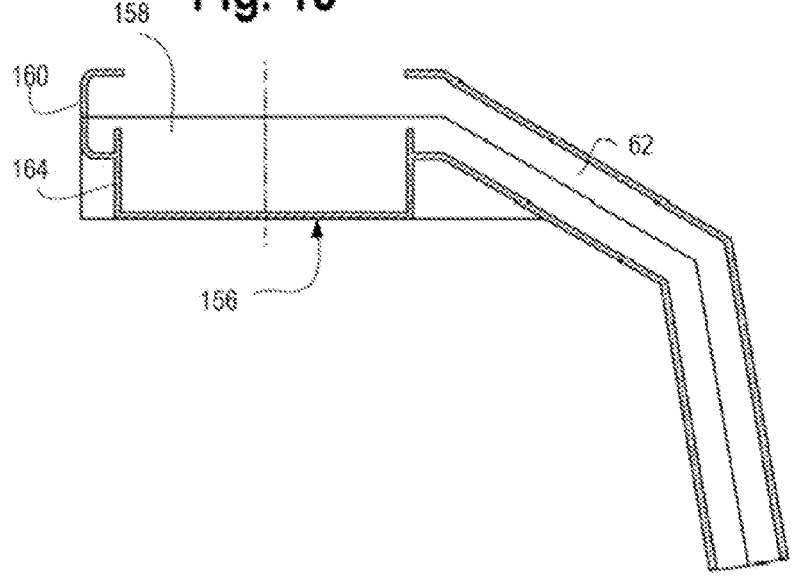

FOOD GRINDER WITH AUTOMATIC HOPPER COVER AND TOOLESS DISASSEMBLY

CROSS REFERENCE TO RELATED APPLICATION

This application is a divisional of and claims the benefit under 35 U.S.C. 120 of application 13/006,994, filed Jan. 14, 2011, which, in turn, is a divisional of and claims the benefit under 35 U.S.C. 120 of application Ser. No. 12/201,161, filed Aug. 29, 2008, which, in turn claims the benefit under 35 U.S.C. 119(e) of provisional patent applications Nos. 60/988,898, filed Nov. 19, 2007; 60/998,350 filed Oct. 10, 2007 and 60/967,299, filed Aug. 31, 2007

BACKGROUND OF THE INVENTION

1. Field of the Invention

This invention generally relates to electric food grinders, and more particularly, to electric food grinders, such as electric coffee grinders.

2. Discussion of the Prior Art

Electrically powered food grinders, such a coffee grinders are well known for both commercial and home use. Such grinders are often provided in the coffee sections of grocery stores at which are shelved bags of unground coffee beans or which hoppers with coffee beans from which customers may fill empty bags provided near the hoppers. Customers who purchase the unground coffee are encouraged to use the provided coffee grinder to freshly grind their coffee.

Many such commercial coffee grinders found in stores have potential problems due to the inexperience of the customers using the grinders or due to inattentiveness. In ordinary course of operation, a customer first selects as prefilled bag of coffee beans or fills a bag from a supply container. The bag is then opened, if not already open, and the contents are poured into the top opening of a hopper. The now empty bag is then placed in a bag fill position beneath an outlet of the grinder from which the ground coffee is emitted. The customer may then manually adjust a knob or other mechanical device to select the coarseness of the grind. The customer then manually actuates a start switch which energizes a grinding drive motor to commence the grinding operation. The grinding operation may end a preselected amount of time after actuation of the start switch. The amount coarseness, or fineness, selected by the customer may also determine the length of time that the grinding continues.

One problem with such grinders is that if the bag or other empty container is not placed at the bag fill position before the start switch is started the ground coffee may fall onto the shelving and floor and be wasted in addition to making a mess that store personnel will need to clean. Sometimes, because there is no lateral support for the bag, the bag falls over either before or after commencement of the grinding operation. Another problem may arise because dust and fine particles of ground coffee may fly out of the open top of the hopper and thereby also create an unsanitary and unsightly condition in the proximity of the grinder.

Also, sometimes the grinding time is longer than necessary which causes excessive wear and tear on the grinding elements and the grinder drive motor. Another disadvantage of some known coffee grinders of the type used in stores is that they take up too much shelf space which is more profitably used to display products to be sold.

The correct operation of the grinder may not be intuitively known and written directions are often provided, but there is no assurance that customers will necessarily follow the directions and admonitions concerning proper use either due to lack of comprehension or subsequent attention to precisely what they are doing and when.

Another problem faced by some known food grinders is the inability to toolessly remove either the hopper for access to the grinding mechanism and the inability to toolessly remove and install the grinding mechanisms for repair or replacement.

A need therefore exists to provide a food grinder that overcomes these and other problems and disadvantages and the like.

SUMMARY OF THE INVENTION

It is therefore the object of the present invention to provide a food grinder that overcomes or ameliorates the problems and disadvantages of known food grinders noted above.

The object of the invention is also achieved by providing a food ingredient grinder, with a grinding chamber with an electrically powered grinding mechanism for grinding food ingredient contained within the grinding chamber, an ingredient hopper having an outlet for passing unground food ingredient to the grinding chamber and an open top for receipt of food ingredient into the hopper, a cover mounted to the hopper for movement between a closed position in which the cover closes the open top and an open position in which the open top is uncovered to enable receipt of unground ingredient, and means for automatically moving the cover between the closed position and the open position.

In the preferred embodiment a cover sensing means is provided including at least one of (a) a magnetic sensor, (b) an electromechanical switch engagable by a member that moves with the cover and (c) a photosensor. The hopper cover is pivotally mounted to the hopper to rotate between the closed position and the open position, and the cover sensing means detects the angular position of the cover relative to the open top of the cover. When an electrical start switch connected to the electrical grinding mechanism is actuated, power is normally applied to the grinding mechanism to begin a grinding operation but a controller is responsive to the cover sensor failing to sense the cover in the closed position to disable the start switch from applying electrical power to the grinding mechanism in response to actuation of the start switch.

Preferably, the grinding chamber and the hopper are supported on a frame member and the automatically moving means includes an elongate member mechanically linked to the cover and releasably connected with a pushing mechanism to push upwardly on the elongate member to swivel the cover to an open position. A resilient member continually applies a resilient downward force on the cover to swivel it downwardly to a closed position, and the downward resilient force being overcome when the pushing mechanism is being pushed upwardly to open the cover.

In the preferred embodiment, an electronic alphanumeric display connected to the controller which selectively displays messages related to the opening of the cover with respect to loading of ingredient into the ingredient hopper.

The objective of the invention is also achieved by providing a food ingredient grinder that has a frame with a top and a bottom, a grinding chamber for holding food ingredient to be ground, with a top having an upwardly facing inlet opening, a bottom resting on top of the frame member and a surrounding chamber sidewall, a grinding mechanism within the grinding chamber and having a fixed grinding burr and a driven rotary grinding burr in grinding relationship with the fixed grinding burr, said fixed grinding burr being attached to the grinding chamber, and means for toolessly, releasably fastening the grinding chamber to the to of the frame member.

In the preferred embodiment the fixed grinding burr is annular with a central hole aligned with the upwardly facing inlet opening to enable passage of food ingredient into the grinding chamber through both the central hole and the upwardly facing inlet. The fixed grinding, burr is releasably attached to the top of the grinding chamber by means of threaded fasteners accessible from the top of the grinding chamber. The fixed grinding burr is attached to the top of the grinding chamber and has a grinding surface that faces downwardly toward the driven rotary grinding burr, said driven, rotary grinding burr having a grinding surface that faces upwardly to mate in grinding relationship with the downwardly facing surface. Also, the rotatable fastener has a body, a fastening end at one end of the body releasably attaching, the grinding chamber to the top of the frame and a manually engagable handle at another end opposite the fastening end for manually rotating the body and the fastening end without the assistance of tools.

BRIEF DESCRIPTION OF TUE DRAWINGS

The foregoing, advantageous features and objectives of the invention will be described in detail, and others will be made apparent, from the detailed description of the preferred embodiment given below with reference to the several figures of the drawing, in which:

FIG. 4B is a side view of only the hopper of FIG. 4 illustrating the mechanism for automatically raising the lid when the lid is in a raised position;

Figure 3:
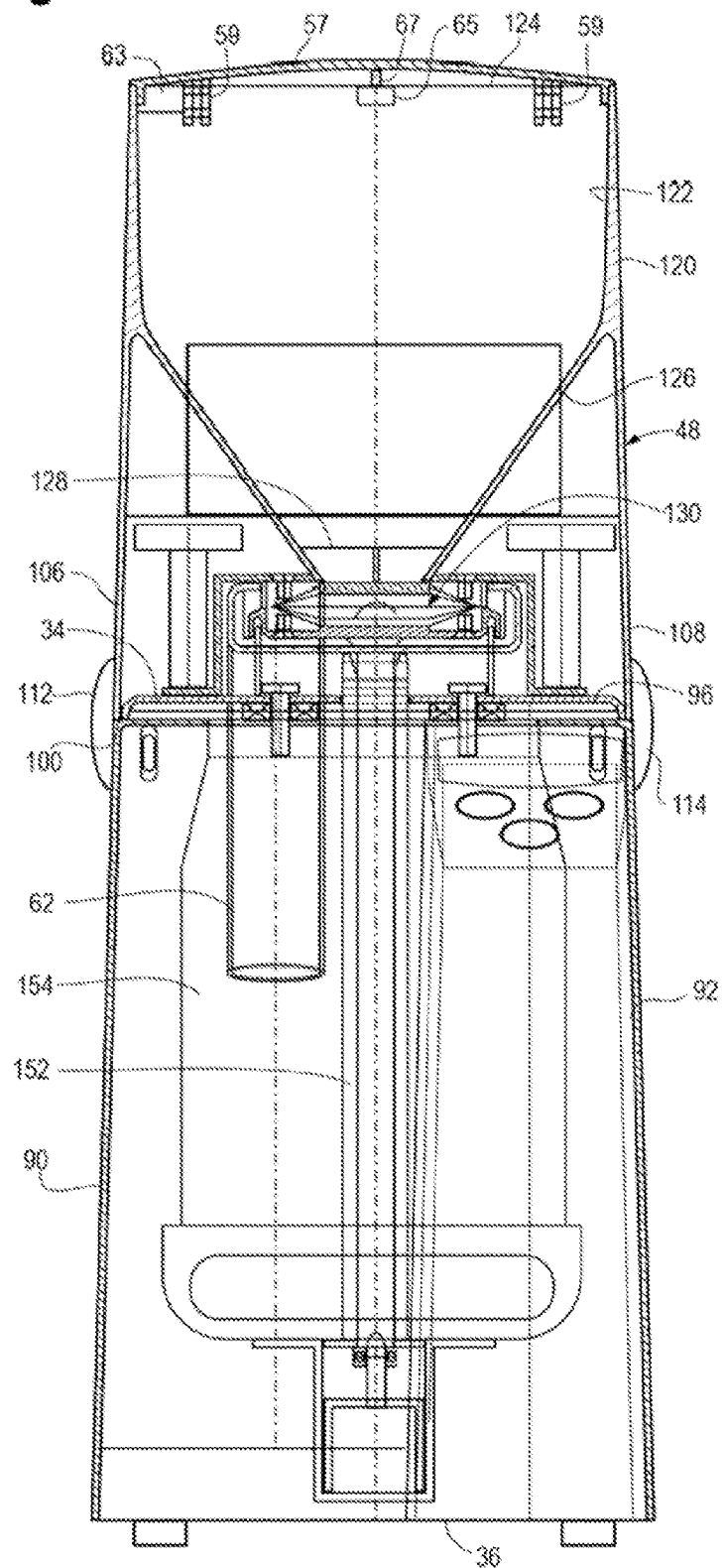
FIG. 3 is a sectional front elevation view of the grinder assembly of FIGS. 1 and 2.
Figure 4A:
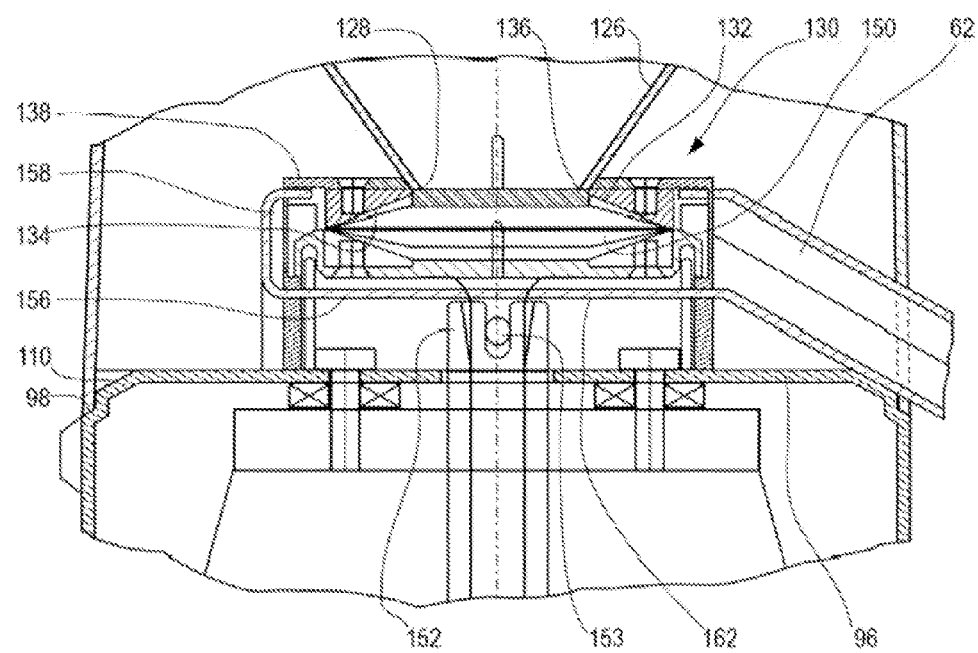
FIG. 4A is an enlarged portion of the sectional, side elevation view of the grinder assembly of FIG. 4.
Figure 4:
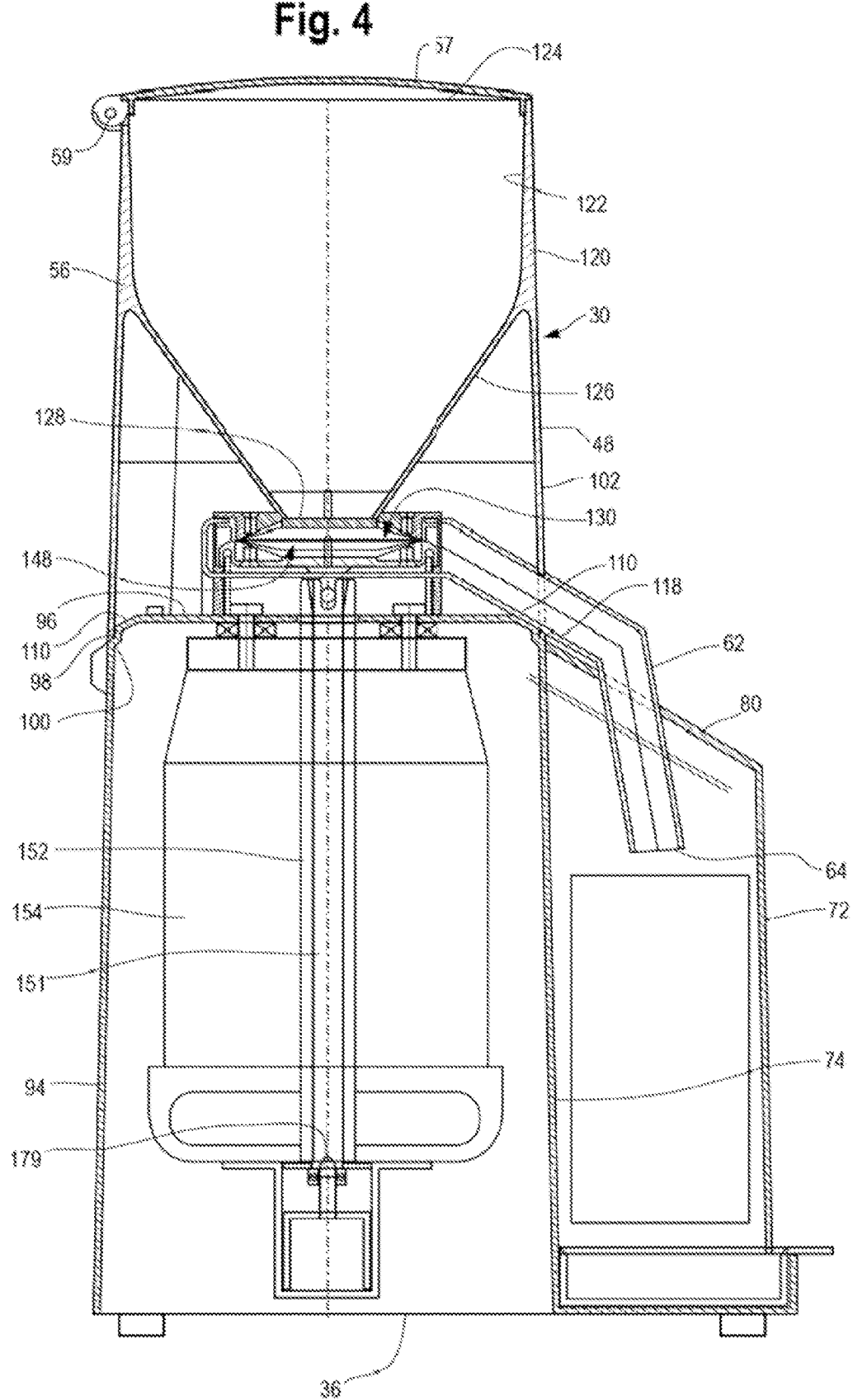
FIG. 4 is a sectional, elevation side view of the grinder assembly of FIGS. 1, 2 and 3.
Figure 5:
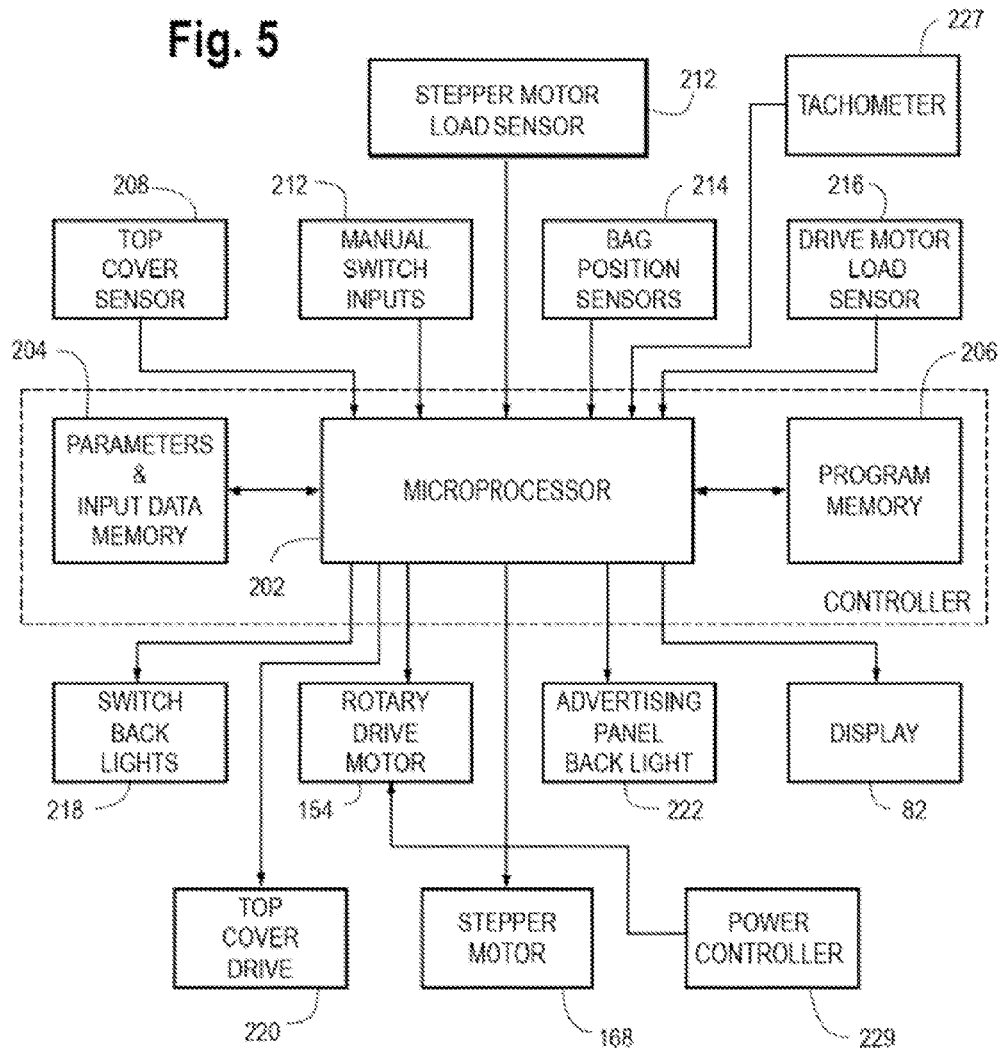
FIG. 5 is a functional block diagram of the grinder assembly of FIGS. 1-4.
Figure 6A:
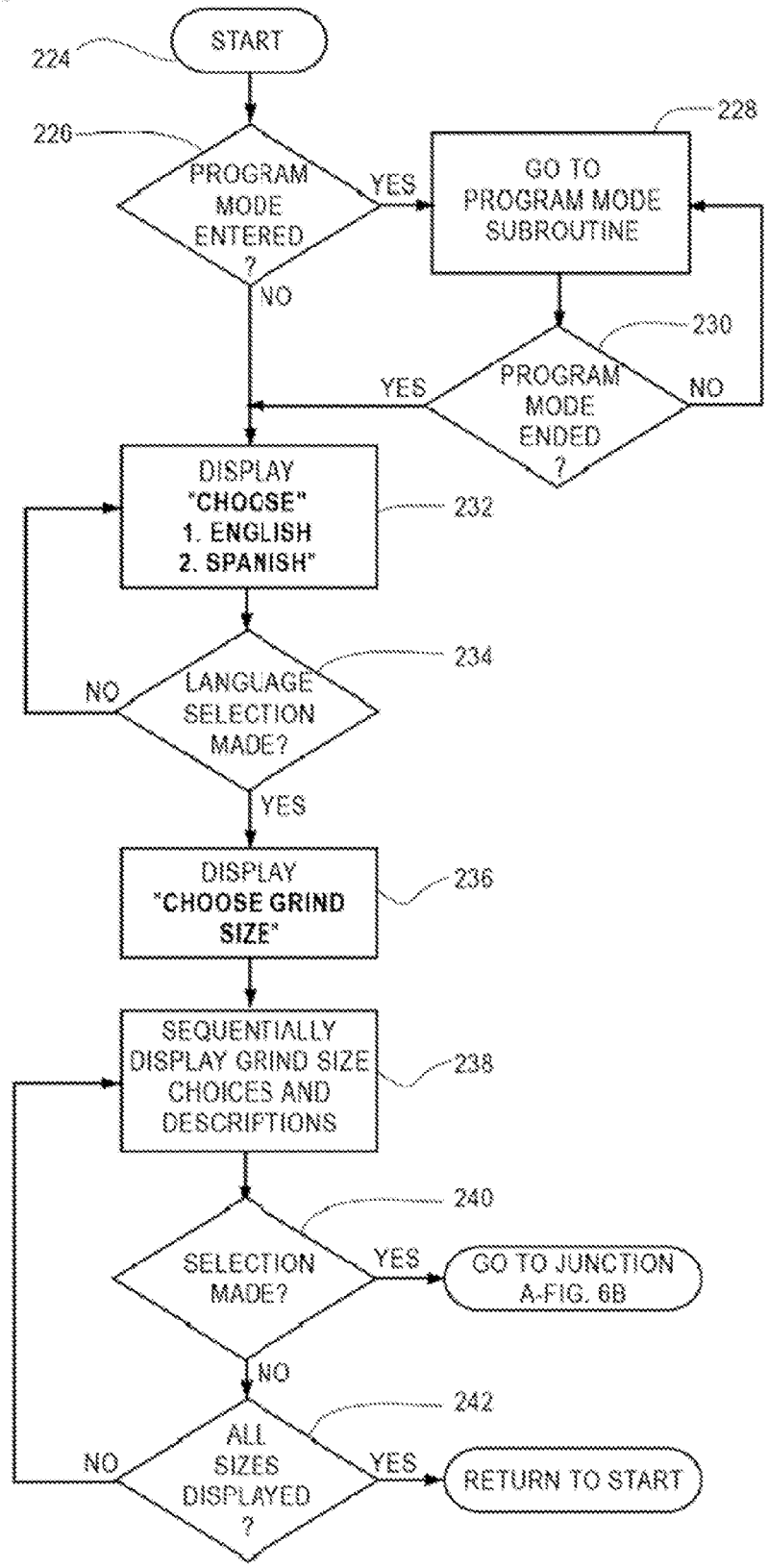
Figure 10:
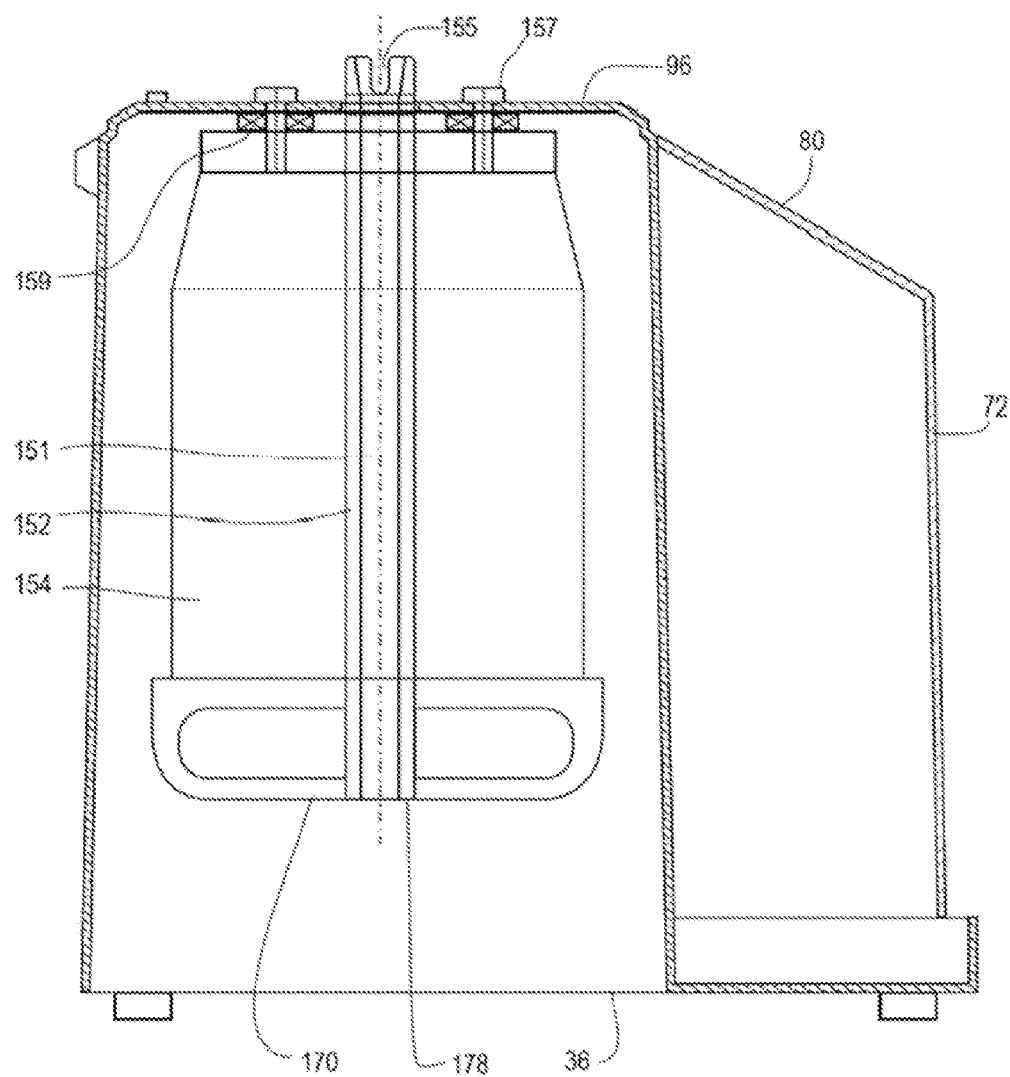
Figure 11:
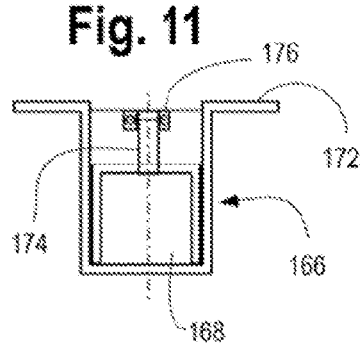

FIGS. 6A and 6B farm a composite logic flow diagram of the preferred mode of operation of the grinder assembly of FIGS. 1-5;

FIG. 7 is a side elevation view of the hopper assembly of the grinder assembly of FIGS. 1-4 which has been removed from the remainder of the grinder assembly and in which a hopper cover is in a retracted, open position to enable receipt of the food ingredient into the hopper body through an upwardly facing top and inlet opening of the hopper body;

FIG. 8 is another side elevation view of the hopper assembly similar to that of FIG. 7 but in which the hopper cover has been returned to a closed, locked position in which the inlet opening to the hopper body is covered;

FIG. 9 is a front elevation view of the hopper assembly of FIG. 8;

FIG. 10 is sectional side view of the grinder assembly similar to that of FIG. 4 but with the hopper assembly, a fixed grinding burr assembly, a grinding manifold including; an exit chute and a movable, rotatable grinding burr assembly have been removed to facilitate viewing of the drive assembly including the relationship between a grinder rotary drive motor and the grinder housing;

FIG. 11 is a sectional side view of an axial-thrusting, stepper-motor assembly that that has been separated from combination with other elements of the grinder assembly of FIGS. 1 through 4;

FIG. 12 is a sectional elevation view of an adjustable, or movably mounted, grinding burr assembly that has been removed from combination with the other elements of the grinder assembly of FIGS. 3 and 4; and FIGS. 13, 14 and 15 are a succession of sectional side views of the manifold and chute assembly previously seen in combination with the other elements of the grinder assembly, as viewed in FIG. 4.

DETAILED DESCRIPTION

Figure 1:
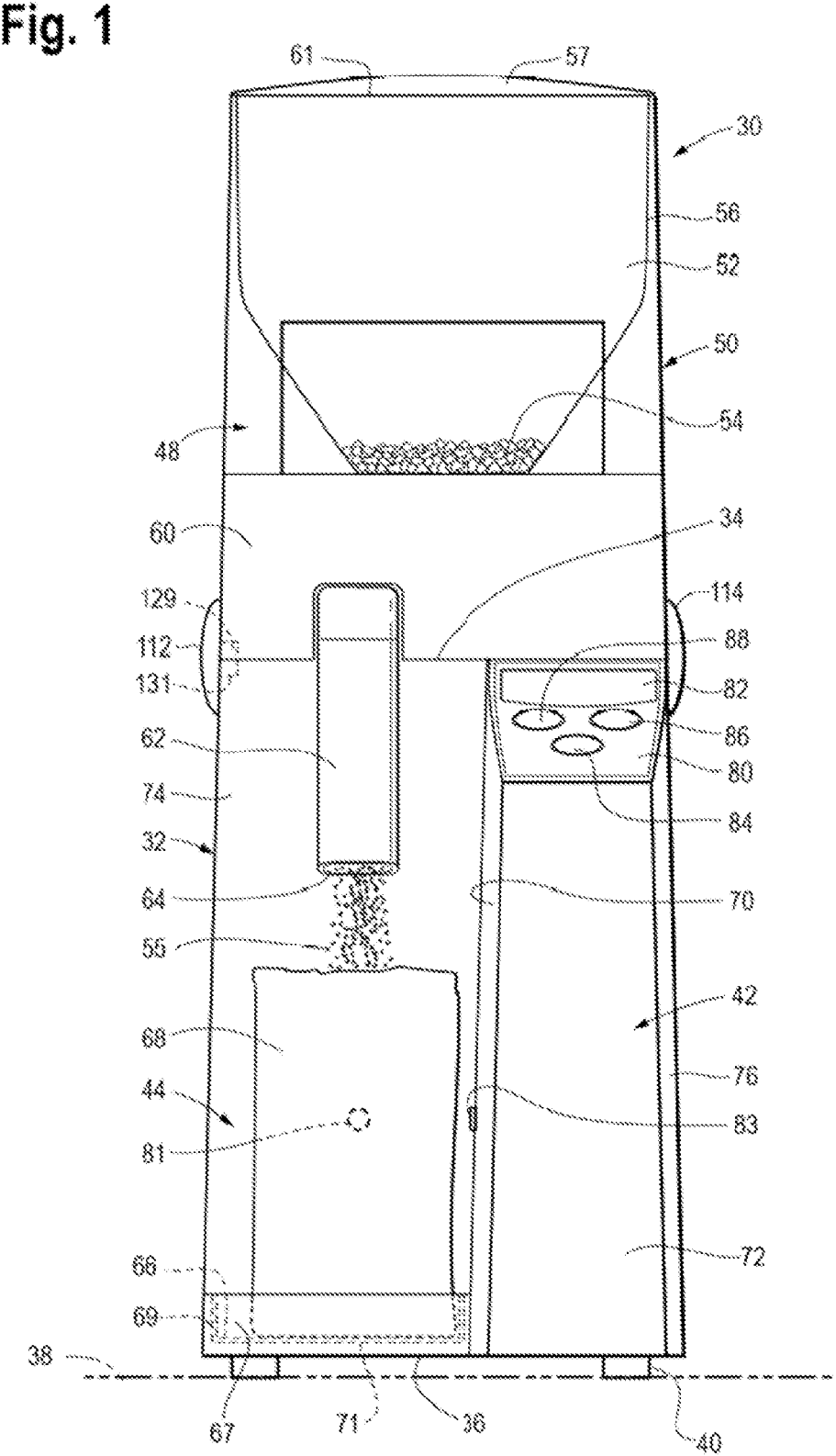
FIG. 1 is as front elevation view of preferred embodiment of the grinder assembly of the present invention.
Figure 2:
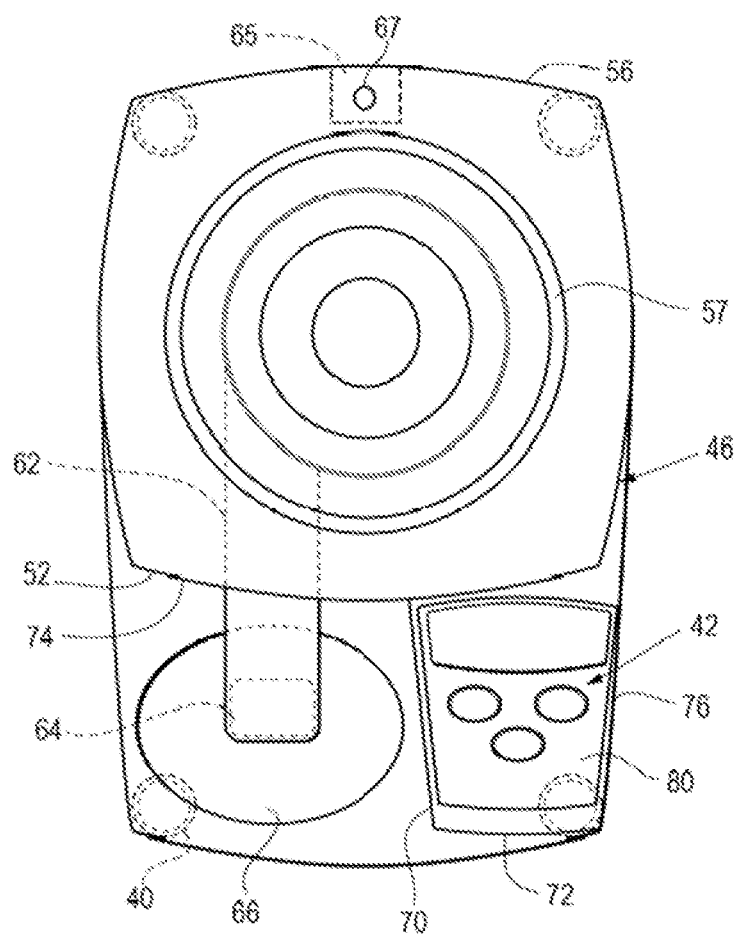
FIG. 2 is a plan view of the grinder assembly of FIG. 1.

Referring to FIGS. 1 and 2, a preferred embodiment of the food ingredient grinder assembly, or grinder, 30 of the present invention is seen to include a housing assembly with a lower housing section 32 having a top 34 and a bottom 36 supported above a counter top or other support surface 38 by km, substantially identical, corner legs 40. The lower housing section 32 includes a forwardly extending control panel section 42 and a relatively recessed bag support section, or location, 44. Height is approximately no more than twenty-one inches; the width is approximately no more than seven inches and the depth is approximately no more than fifteen inches Supported on a back portion 46 of the top 34 of the lower housing section 32 is a manually, toolessly, removable hopper housing assembly 48 having an upper section 50 with a hopper 56. The hopper housing assembly 48 may be manually removed from, and operatively reattached to, the remainder of the grinder 10 without the need for any tools. The upper section 50 is formed of four, substantially identical, outwardly extending, convex, curved, interconnected sidewalls. A front sidewall 52 of the interconnected sidewalls is translucent, preferably transparently translucent, at least in part, to enable viewing of food ingredient 54 to be ground, such as coffee beans, contained within the hopper 56 in the upper section 50.

The hopper 56 is protectively housed within and supported by the four interconnected sidewalls of the upper section 50 including the front sidewall 52. The back of a top cover 57 is pivotally mounted to the top of the hopper 56 by means of a pair of hinges 59 at the back 61 of the hopper 56, as seen in FIG. 3. The hinges 59 are spring biased by a spring 63 to automatically move the top cover 57 to a closed position covering a hopper inlet opening 61, and to hold the top cover 57 in the closed position, as shown in FIG. 1, unless raised to an open position to allow ingredient to be dumped through the inlet opening 61 and into the hopper 56.

Figure 4C:
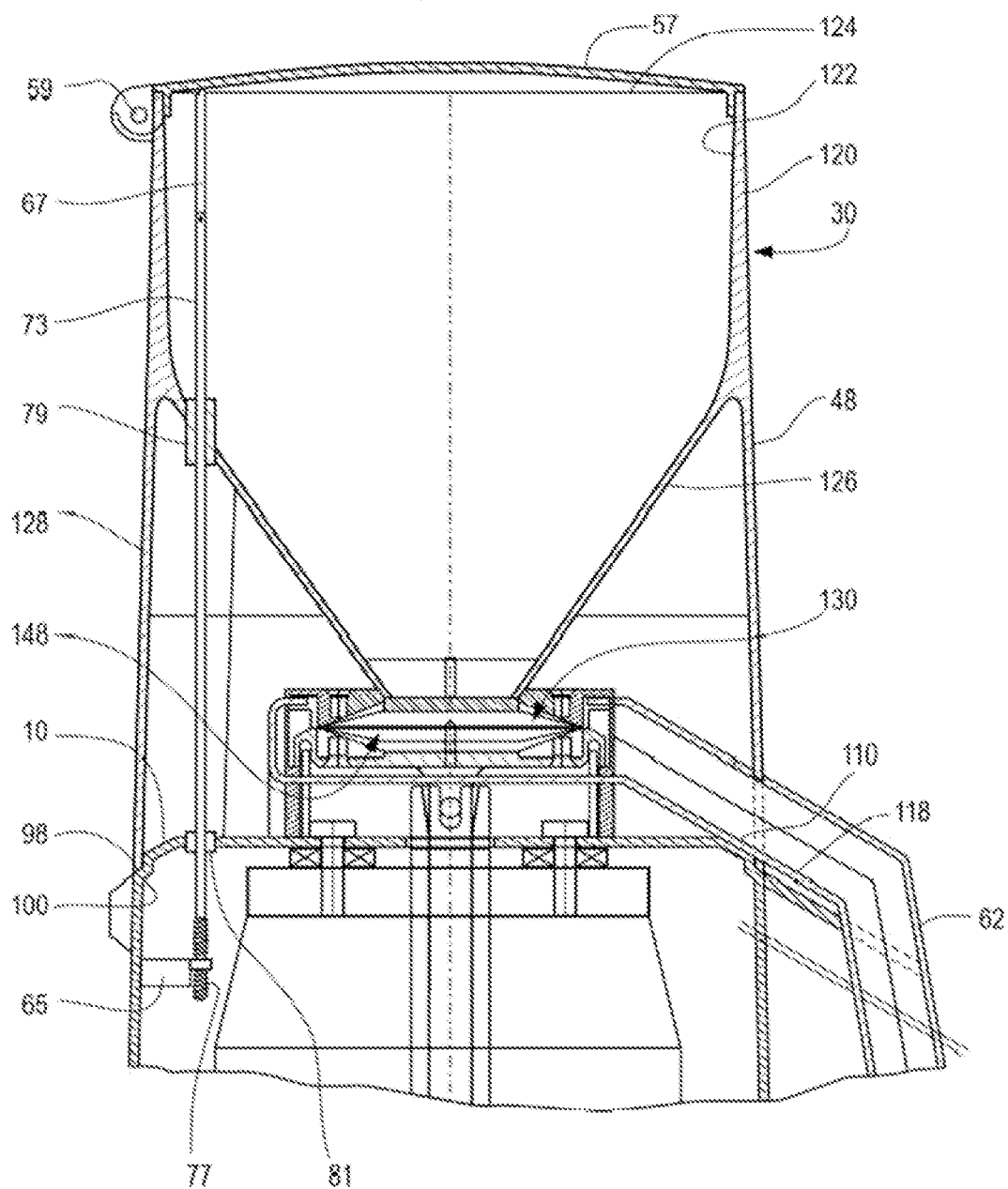
FIG. 4C is an enlarged portion of the grinder of FIG. 4, illustrating the mechanism for automatically closing the lid when in a closed position.

The top cover 57 may be manually opened by pivoting it upwardly, but preferably it is selectively automatically opened by an electromechanical, automatic opener that is selectively controlled to pivot the top cover 57 to the open position, as shown in FIG. 7. Preferably, the automatic opener includes a solenoid, servo motor or other suitable electromechanical device, 65 or the like secured to the interior of back side of the hopper assembly with a longitudinally movable pusher rod 67 of a an automatic lid opener and closer, linked to the underside of the cover to push it upwardly to an open position, as shown in FIG. 4B, or to pull it or allow it to move downwardly under force of the bias spring 63 to a closed position, as shown in FIG. 4C. Alternatively, the automatic opener may comprise a small rotary servomotor linked to a portion of the hinge 59 and connected to the cover 57 to selectively pivot the cover 57 to the open position. Electrical power connection to the servomotor 63 is made though suitable electrical leads and releasable electrical connectors (not shown) protectively contained within the sidewalls of the hopper assembly body.

A lower section 60 of the hopper housing assembly 48 is defined by four lower sidewalls that are a downward continuation of the four interconnected sidewalls of the upper section 50. All the sidewalls of the lower section 60 are opaque to prevent viewing into the lower section 60. The lower section 60 protectively surrounds other operational elements of the food ingredient grinder 30 that will be explained in detail below with reference to other drawing figures. These other operational grinding elements grind the unwound ingredient 54 to make it into ground ingredient and then pass the ground ingredient 55 to a chute 62. The ground ingredient 55, such as ground coffee beans, passes from the operational grinding elements within the lower section 60 through the chute 62 to an outlet 64. The outlet 64 faces downwardly and directly, vertically overlies a bag support surface 66 of the recessed bag support section 44.

The bag support surface 66 is preferably the bottom of a removable catch pan 67 with surrounding sidewalls 69, FIG. 1, for containing any possible ingredient that may overflow from the top of the bag 68 or which inadvertently misses the bag. The catch pan 67 is supported within a mating depression 71 in the bottom 36 that is generally larger than the bottom of the bag 68. The distance between the support surface 66 and the overlying chute outlet 64 bag support surface accommodates bag sizes from eight inches to fourteen inches in height for holding one to two pounds of ground coffee, or the like. The hopper capacity is approximately two pounds of coffee beans, which because they are unwound, require a larger volume than the fourteen inch bag. After the bag is removed, the catch pan 69 may be removed from the mating depression 71 and any ground coffee 55 in the catch pan 69 poured into the bag. If the bag is already filled, the excess may be poured into an overflow bag or other container for later use by returning it to the hopper, or disposal.

During the grinding operation an empty, open bag 68, or other suitable container, is supported within the catch pan 69 with the open top firing upwardly beneath the outlet 64 of the chute 62 for receipt of ground coffee beans or other food ingredient released from the outlet 64.

The forwardly extending control panel section 42 has an interior side wall 70 that provides lateral support for the bag 68 and also provides an alignment indicator to guide the bag in proper position on the bag support surface 66 directly beneath the outlet 64. The interior sidewall 70 extends from a from wall 72 of the control panel section 42 to a front wall 72 of the bag support section 44. The front wall 72 is generally aligned with and forms a continuous surface with the front wall 52 of the upper, removable hopper assembly 48. The back wall 74 provides another guide for correctly locating the bag 68 on the bag support aligned beneath the outlet 64. An outer sidewall 76 of the control panel forms a continuous surface with the sidewall 78 of the back portion 46 of the lower housing assembly.

The top, or control panel, 80 of the control panel section 42 is sloped downwardly and forwardly from the front wall 52 adjacent the top 34 of the lower housing section to the front wall 72 of the of the control panel section 42. This slope facilitates visibility of the control panel 80 and the display and operator controls mounted to the control panel 80. In addition, it prevents resting drinks and the like on the control panel 80 that might cause damage, stains or otherwise or interfere with operation of the controls.

Preferably, a forwardly facing photosensor 81 in the back wall detects when a bag is laterally aligned with the chute outlet 64, and a sideways looking photosensor 83 in the sidewall 70 senses when a hag 68 is forwardly aligned with the chute outlet 64, in order to prevent spillage, both sensors 81 and 83 must sense the presence of the bag 68 in order for a grinding cycle to begin, or if a grinding cycle has already begun, for the grinding operation to continue. In lieu of photosensors, the sensors 81 and 83 may be replaced by capacitive sensors, touch sensors or any other like bag detection devices.

The front wall 72 of the control panel section 42 is preferably a translucent backlit advertising panel containing color advertising graphics, photographs and advertising messages. Preferably, the advertising panel is formed of double-walled, transparent plate with a gap for receipt of different, interchangeable, translucent advertising inserts that carry the advertising material.

The display and operator controls preferably include a liquid crystal display 82 for display of alphanumeric messages and associated graphics that may be used to communicate with the user to provide prompts for operation of the grinder. The display 82 is also usable for communications with an operator, maintenance technicians or installer during parameter programming and operations monitoring. The display 82 may also be an interactive screen, or touch-screen, which may be used for inputting information simply by touching the screen at selected displays of icons to select the control functions associated with grinder operations. Preferably, a voice simulator speaks whatever message is being displayed.

In addition, mounted to the control panel are three backlit switches including a start-grind switch 84, a grind setting selection switch 86 and at screen navigation switch 88. There are preferably six grind settings: Espresso, represented by as espresso machine icon shown on the display 82; Drip Single cup, represented by the number one within a small flat bottom filter; Drip Four Cup, represented by the number four within a small flat bottom filter icon; Drip Twelve Cup, represented by the number twelve within a larger flat bottom filter; Drip Woven Wire Screen, represented by a woven wire filter icon; and French Press, represented by a French Press icon. The actual different relative grinding positions between the grinding elements associated with the six possible settings are preferably pro-set at the point of manufacture, but they may also be adjusted in the field by qualified personnel that have access codes to enable changing the preselected grind settings.

Referring to FIGS. 3 and 4, the back portion 46 of lower housing section 32 functions as a main frame, with a frame body extending between the top 34 and the bottom 36. This frame body includes four generally substantially identical sidewalls 90, 92, 94 and 74 that are respectively connected along their vertical extents at four corners, 74 extends across the front; wall 94 extends across the back; wall 90 is on the left side and wall 92 is on the right side. All the walls are slightly tapered inwardly and upwardly for enhanced strength and stability, and are all joined at their top edges to a generally horizontal, planer frame member 96 at the top 34. Preferably, the walls 90, 92, 94 and 74 and the planer frame member 96 are integrally formed from a single piece of molded plastic or other like synthetic material.

At the tops of all the walls are substantially identical, inwardly extending, horizontally aligned shoulders, or support ledges, 98 upon which the bottom edge 100 of the mating walls 102, 104, 106 and 108 of the hopper and housing assembly 48 are releasably supported. The shoulders are preferably outwardly and downwardly sloped to facilitate fitting the bottom edges 100 onto the shoulders 98. Also, located inwardly adjacent each of the support ledges are downwardly and outwardly extending guide surfaces 110 to guide the bottom edges 100 outwardly onto the support ledges 98 as the hopper assembly 48 is lowered down onto the main frame.

Likewise, referring to FIG. 3, the top of wall 94 has a rearwardly and downwardly extending support member 116 with as top surface that forms a continuous extension of the support ledge 98 to provide an additional support during mounting. This additional support is achieved, by first placing the rear edge on the support member 116 and then tipping the hopper assembly 48 forwardly until the front bottom edge 100 is received on the support ledge 98 at the front. The guide surface 110 at the front is parallel to and provides underlying support for an inner downwardly and outwardly extending section 118.

Once the hopper and housing assembly 48 has been lowered into place, a pair of lateral restraint members 112 and 114 respectively mounted to the outside surfaces of the side walls 90 and 92 and extend above the support ledges 98 to block bottom edges from moving, outwardly of the support ledges 98. The lateral restraint members 112 and 114 overlap the junction between the bottom edge 100 and the support ledge 98.

Referring to FIGS. 4B and 4C, the pusher rod 67 is pivotally linked to an upper end of an elongate pusher member 73 that extends through the conical wall 126 of the hopper to a distal end 75 that is engaged by a drive member 77 of the electromechanical drive mechanism 65 mounted to the back of the lower frame. The upper end of the drive member 77 preferably has an upwardly facing convex seat for guided receipt and support of the lower end of the pusher member 73, but is not fixedly attached to the drive member to allow the hopper to be toolessly removed and remounted. The drive scat is preferably rotatably mounted to the drive member by means of ball bearings 181, FIG. 11. The elongate pusher member passes through holes surrounded by suitable resilient sealing grommets 79 and 81.

Referring also to FIGS. 7, 8 and 9, the hopper 56 of removable ingredient hopper assembly 48 has an upper section 120 with a cross section that is generally square, except for the outward bowing of the walls, and an open top 124. The open top as previously rioted is selectively closed by hinged cover 57. The interior surface 122 of the upper section is slightly inwardly, downwardly tapered to facilitate downward inward movement of the ingredient 54 to a lower generally conical section 126. The generally conical section 126 has a tapered body extending substantially inwardly and downwardly from the bottom of the upper section 120 to a relatively narrower hopper open outlet 128. As best seen in FIG. 9, a slot 61 is contained in the bottom 34 of the lower opaque section 60 of the hopper assembly to accommodate the chute 62.

The walls 102, 104 and 106 extend generally straight down from the juncture of the upper section 120 and the lower conical section 126 and protectively surrounded the conical section 126 in spaced relationship. They also protectively surround other elements located between the conical section 126 and the walls 102, 104, 106 and 108 and beneath the open hopper outlet 64. The bottoms of the walls 102, 104, 106 and 108 are merely resting upon the top edge 100 of the top of the lower housing section, or frame, 32, as seen in FIG. 1. Thus, the hopper assembly 56 is toolessly-manually, releasably supported by the frame 32 in an operative position with the hopper outlet 128 being open to pass ingredient within the body downwardly. Preferably, the bottom of the hopper 56 and the top of the frame 32 carry at least one set of mating magnetic connectors 129 and 131, FIG. 1, to facilitate securement of the interconnection between them.

The terms tooless-manually or toolessly is intended to mean that the item in question is manually removable or mountable without the need for, or use of any hand tools, such as wrenches, screw drivers and the like. Dismounting of the hopper assembly 56 is achieved merely by manually grasping and manually lifting the hopper assembly 56 off of the lower housing section, or frame, 32. Mounting of the hopper assembly 48 is likewise achieved simply by manually lowering the hopper assembly down onto the top edge 102 of the lower section 32 between the lateral restraint members 112 and 114 without the use of tools. The magnetic connectors 129 and 131 eliminate the need to mechanically latch or lock the hopper assembly 56 to the lower housing section 32. Advantageously, this tooless attachment and separation of the hopper assembly 56 significantly increases the speed with which one hopper may be replaced with another or removed for access to the lower elements of the food grinder 30 located beneath the hopper outlet 128 and then reconnected.

Once the hopper assembly 48 is removed from the top of the lower section, the other elements of the food ingredient grinder 30 located beneath the hopper assembly 48 may also be toolessly removed for repair, replacement or cleaning.

Figure 3A:
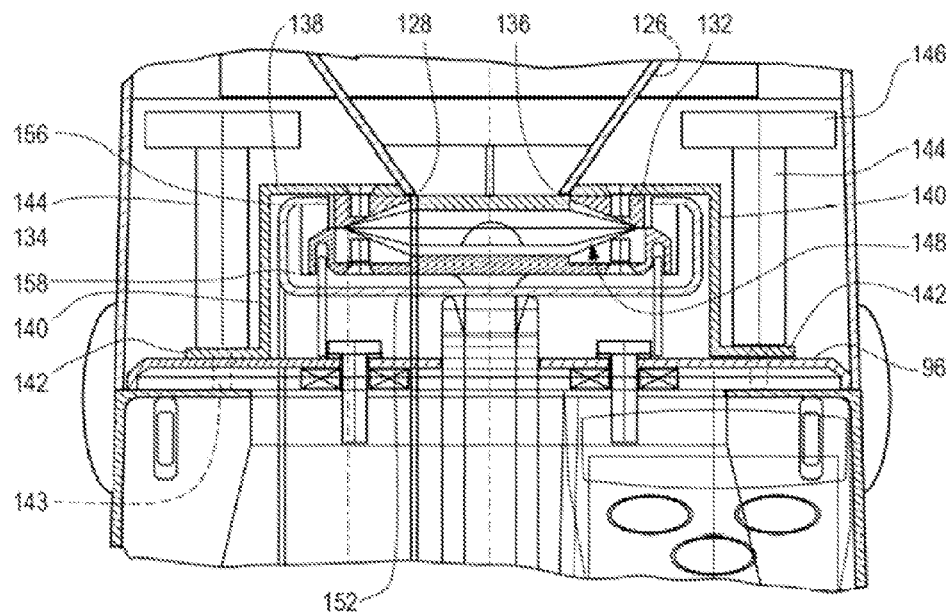
FIG. 3A is an enlarged portion of the sectional front elevation view of FIG. 3.

Referring also to FIGS. 3, 3A, 4 and 4A, located beneath the removable ingredient hopper outlet 128 is a toolessly removable grinding assembly 130. The grinding assembly 130 includes a fixed grinder assembly 132 with a mounting table 136 located immediately beneath the removable ingredient hopper assembly 56. As best seen in FIGS. 3A and 4A, the fixed grinder assembly 132 does not move during the grinding operation or during adjustment of the grind setting and is tooless-manually releasably attached to the frame member in a fixed operative location beneath the hopper assembly 56. The fixed grinder 132 has a fixed grinding burr 134 with a fixed burr opening 136 that aligns with an opening, in the table 138. The opening 136 and the aligned opening in the table 138 are both aligned with the hopper outlet opening 128 through which ingredient from the hopper outlet 128 is received. The fixed grinding burr 134 is attached to the underside of the table 138 and has a downwardly extending, downwardly facing, annular, truncated conical grinding surface that surrounds the fixed burr opening 136.

The fixed grinding burr 134 is preferably attached beneath fixed burr mounting table 138 by a plurality of substantially identical magnetic pins 139 that extend into upward facing mating holes in the top of the burr 134 and through aligned fastener openings in the mounting table. The magnetic pins 139 have handles 141, FIG. 4A, extending sufficiently above the to of the mounting table 138 to enable them to be manually pulled out of their mounting hole without the use of tools. Alternatively, the magnetic pins 139 are replaced by threaded fasteners with laterally extending handles at the top, like those on commonly known wing-nuts to enable manual rotation of the threaded fasteners without the use of tools. This releasable attachment of the fixed grinding burr 134 to the burr mounting table 138 enables easy replacement of the fixed grinding, burr 134 when it becomes worn.

The mounting table 138 is supported above the horizontal frame member 96 by a pair of vertical, rectangular legs 140 extending downwardly from opposite sides of the top of the mounting table 138. The bottom ends of the legs 140, in turn, are supported by a pair of outwardly extending, horizontal foot members 142.

The horizontal foot members 142 are toolessly releasably attached to the top of the horizontal frame member 96 by means of a pair of manually actuatable fasteners 144. The bottom ends of the manually actuatable fasteners 144 pass through mating holes in the foot members 142 and into releasably locked engagement with mating female fasteners 143 carried by the horizontal frame member 96. The mating female fasteners are preferably threaded bores for receiving threaded male members located at the bottoms of the manually actuatable fasteners 144. Alternatively, rotatable interlocks within the bores interlock with a mating interlocking member at the bottom ends of the manually actuatable fasteners 144. The fasteners 144 have elongate, relatively narrow bodies with handles 146 that are relatively wider to provide a mechanical advantage facilitate manual rotation of the manually actuatable fasteners 144 without the use of any tools. In order to remove the mounting table 138, all that is needed is to first toolessly remove the hopper assembly 148 and then manually rotate the fasteners 144 to an unfastened position. The mounting table 138 with the fixed grinding burr 134 attached is then simply, manually lifted off the horizontal frame member 96. The magnetic pins 139 ma then be pulled out of engagement with the fixed grinding burr 134 and the fixed grinding burr may then be toolessly removed and a new grinding burr toolessly installed. The mounting table 138 may then be moles reattached to the horizontal frame member 96.

Referring also to FIG. 12, located beneath the fixed grinding assembly 132 is a rotary grinder assembly, or rotary grinder, 148. The rotary grinder 148 includes an upwardly facing, annular, truncated conical, rotatable grinding burr 150. The rotary grinding, burr 150 may be substantially identical to the fixed grinding burr 138 and is fastened to the top of a rotary mounting plate 149 by means of magnetic mounting pins 155 substantially in the same way the magnetic pins 139 with handles 141 fasten the fixed grinding burr to the mounting table 138. Alternatively, threaded members with handles are used to toolessly attach the rotary grinding burr 150 to the rotary mounting plate 149.

The rotary mounting plate 149 is centrally supported at the top end of and is preferably integrally formed with, an elongate rotary drive member 151. Adjacent the rotatable grinding bun 150 and near the top of the drive member 151 is an outwardly radiating releasable male locking member 153.

Referring, also to FIG. 10, the rotary drive member 51 is tooless-manually, releasably linked to a hollow, cylindrical, drive shaft 152 of an electrical rotary motor 154. The motor 154 is releasably, toolessly attached to the upper frame member 96 by means of threaded fasteners 157. The fasteners 157 pass through shock absorbing pads 159 that isolate vibrations of the motor 154 from the top frame member 96 and the hopper assembly 148 mounted thereon.

The rotary drive member 151 is slidably received within the hollow drive shaft 152 until the male locking member 153 is slidably received in a mating locking slot 155 at the top of the drive shaft 152, as shown in FIGS. 4 and 4A. With the locking member 153 within the slot 155, the rotary drive member 151 is constrained to rotate with rotation of the hollow drive shaft 152. When energized, the electrical rotary motor 154 rotatably drives the hollow rotary drive shaft 152 which, in turn, rotates the rotary drive member 151. The drive member 151, in turn, rotates the mounting plate 149, FIG. 12, and the rotatable grinding burr 150 while in mating, grinding relationship with the fixed grinding burr 134.

Referring now to FIGS. 3, 4 and 11, the relative position of the rotary grinding burr 150 and the fixed grinding burr 132, or spacing between the grinding burrs that determines the fineness of the grind, is determined by the position of a stepper motor assembly 166. The stepper motor assembly 166 includes a stepper motor 168 that is mounted to the bottom 170 of the drive motor 154 by a rotatable cradle mount 172. The stepper motor 168 has a vertical reciprocal drive member 174 with an end support 176 upon which the bottom end 177 of the drive member 151. FIG. 12 is supported. The end 177 protrudes slightly from the bottom of the hollow drive shaft 152, is rotatably mounted to the drive member 177 and has a semispherical recess 61 within which a matching semispherical ball 179. FIG. 4, at the end of the reciprocal drive member 174 is received. This support without attachment is preferred for it allows the rotary burr 150 to be toolessly removed and replace simply by lifting the drive member 151 out of the hollow drive shaft 152 after the fixed burr mounting table is toolessly removed.

When the stepper motor 168 is energized, the reciprocal drive member 174 is caused to either slidably move upwardly or downwardly within the hollow drive member 152 depending upon the direction in which the stepper motor 168 driven. If the movement is upward, the movable, rotary grinding burr 150 is moved upwardly and closer to the fixed grinding burr 130 for a relatively finer grind. If the movement is downward, the movable, rotary grinding burr 150 is moved downwardly away from the fixed grinding burr 130 for a relatively coarser grind. A stepper motor position sensor 212, FIG. 212, associated with the stepper motor 168 provides an indication of the position of the reciprocal drive member 174 relative to the body of the stepper motor 168. Alternatively, or additionally, the position is determined by electronically counting the number of steps the stepper motor 168 has advanced either forwardly or backwardly front a home position. Alternatively, the stepper 168 is replaced with a solenoid, servo motor or any other electromechanical device that can be suitably employed to raise and lower the rotary burr 150.

Referring also to FIGS. 13, 14 and 15, the ingredient 54, while being ground, is temporarily contained within a toolessly removable manifold assembly, or grinding, chamber assembly, 156. The grinding chamber assembly 156 has an upper cylindrical side wall 160 defining a grind chamber 158 protectively surrounding the annular fixed grinding burr 132 and the rotary grinding burr 150 when in mating, grinding relationship. A relatively narrower cylindrical base 164 supports the grind chamber 158 above the top, horizontal, frame member 96. The base 164 has a circular bottom 162 that rests upon and is toolessly supported by the horizontal frame member 96. As seen in FIG. 13, the bottom 162 has an opening for receipt of the driven rotary member 151 of the rotary grinding assembly 148. The chute 62 extends radially outwardly from the cylindrical sidewall 160 and communicates with the interior of the manifold bed 158 for passing ground ingredient 55 from within the manifold body 158 to the outlet 64 above the bag location. The top of the rotary drive member 152 is protectively contained within the base 164.

Referring now to FIG. 5, the grinding, assembly 30 of the present invention is automatically controlled by means of a controller 200 having a microprocessor 202 operating, in conjunction with a parameter and input data memory 204 and a program memory 206. The microprocessor 202 has inputs from the top cover sensor 208, the manual switch inputs 210, from the stepper motor position sensor 212, bag position sensor inputs 214 and from the drive motor load sensor inputs 216. The top cover sensor 208 is any suitable detector, such as a limit switch or a magnetic sensor switch responsive to the position of the cover 57, FIG. 2, or to the position of the pusher member 67 or to the drive position of the electromechanical device 65, that provides an indication of when the lid 57 is in a closed position, as shown in FIG. 8, or in an open position, as shown in FIG. 7. The manual switch inputs 212 are from the switches 84, 86 and 88 of FIG. 1. The stepper motor position sensor 212 senses the position of the stepper motor, and thus the relative position oldie movable grinding burr and the fixed grinding burr. The bag position sensors inputs 214 are from the bag sensors 81 and 83, FIG. 1, and indicate whether or not a bag is in correct position to receive ground ingredient.

Figure 5A:
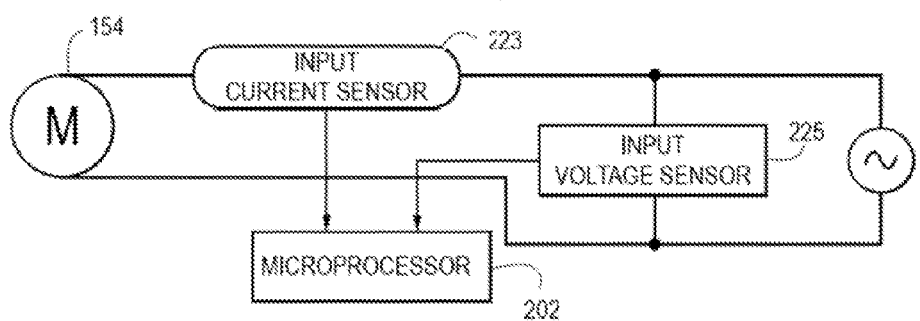
FIG. 5A is a circuit block diagram of a circuit for monitoring the input power to the drive motor of the grinder of FIGS. 1-4.

The drive motor load sensor 216 is electronic sensor that responds to the changes in input electrical power to determine when the entire amount of the ingredient has been ground and there is no longer ingredient between the grinding burrs. The electrical input power is determined by the microprocessor controller 202 from inputs from an input current sensor 223 and an input voltage sensor 225, FIG. 5A.

The microprocessor controller 202, in addition to responding to a decrease in input, power to determine when grinding is completed, the microprocessor controller also responds to a tachometer 227. The tachometer senses the rotational speed of the drive motor 154 and the controller 202 increases input power when a momentary decrease in rotational speed occurs beneath a preselected minimum, such as one thousand revolutions per minute. Such a reduction in speed may occur when the grinder motor meets with a larger than usual output load. When such a decrease in speed occurs, the controller 202 increase the input power being provided to the drive motor 154 by a power controller 229 to help the drive motor 154 regain and maintain the preselected rotary speed. The controller 202 may also respond to a decrease in speed or the rotary drive motor to increase the time period of a maximum grind time clock period, FIG. 6B, to allow a longer period of time to complete the grinding operation.

The controller 200 responds to these inputs to control various elements of the grinder assembly 30 in accordance with the logic flow chart of FIGS. 6A and 6B, as describe below. Generally, the controller responds to the manual switch inputs to actuate switch back lights 218 indicating the status of the switches or the grinder in general. Likewise, the controller controls the display 82 to communicate status and information needed for setting parameters or otherwise programming or operating the grinder assembly 30. A top cover drive 220 receives output signals from the controller 200 to selectively energize the automatic opener opening and closing the lid 57. An advertising panel back light 222 is selectively lit under control of the microprocessor 202. Interface circuits (not shown), as needed, are provided between the microprocessor 202 and the various input and output devices.

Referring to FIG. 5, as noted above, in keeping with one aspect of the invention, instead of establishing different preselected time durations for the grinder to operated before the drive motor is turned off in keeping with the present invention, the grinding is stopped when the microprocessor controller 202 senses that the input power to the drive motor 154 has dropped to a preselected level indicating that it is no longer working, against a load of ingredient being ground and the grind chamber is empty. An input current sensor 223 provides to the microprocessor 202 an indication of the input current being provided to the rotary drive motor 154 and an input voltage sensor 225 provides to the microprocessor 202 an indication of the input voltage being provided to the rotary drive motor 154, and from these indications, the microprocessor 202 calculates the input power. The input current sensor 223 and the input voltage sensor 225 may be associated with the input power controller 229. Instead of the input voltage sensor 225 being provided, the input voltage ma be assumed to remain constant at standard line voltage, and the calculation of input power is based on the measured input current and this assumption of input voltage.

The level of reduced power that corresponds to a an empty grind chamber is empirically determined, and when the input power falls beneath this level, the input power controller 229 is caused to terminate input power to the rotary drive motor automatically. A backup timer associated with the controller 202 may also shut off power to the rotary drive motor 154 after a preselected maximum time period in the event the power is not automatically terminated in response to a decrease in input power to the drive motor.

Referring now to FIGS. 6A and 613, the microprocessor 202 preferably operates with software in accordance with the logic flow chart, shown. After startup at step 224, in step 226, it is determined whether the program mode has been entered in step 226. If the program mode has been entered, then program proceeds to a program mode subroutine 228 in which various parameters may be entered into the parameter and input data memory 204. If the program mode is ended, or has timed out due to lack of an input command, then in step 230 the program moves to step 232. In step 232, the display 82 shows a message requesting the user to select a language. After a language selection is made in step 234, the display is caused to display a message requesting the user to choose a grind size or grind setting in step 236. Then in step 238, a plurality of grind sized choices and descriptions are displayed sequentially. If a selection is made in step 240, then the program proceeds to Junction A of FIG. 6B. If not, but all sizes have been displayed, then in step 242, the program returns to start 224.

Referring now to FIG. 6B, Junction A proceeds to step 244 in which the top cover 57 is retracted, or opened, as shown in FIG. 7, as the display shows the message "RETRACTING TOP COVER". After it is determined that the top cover 57 has been fully retracted in step 246, in step 248 the display 82 is caused to show the message "PLEASE LOAD YOUR COFFEE SELECTION". After it is determined that the coffee has been loaded in step 250, either by the user actuating one of the switches 84, 86 or 88, or by a strain gage or other sensor that detects the presence of a minimum amount of coffee within the hopper, then in step 252 the display shows the message "RETURNING TOP COVER" while in step 254 the cover is automatically closed by de-energizing the automatic opener.

Once it is detected that the cover is fully closed in step 256, in step 258, the display is cause to show the message "PLEASE PLACE BAG IN THE BAG HOLDER". After the user places the bag in position and it is detected to be in position in step 260, as indicated by the bag position sensor inputs 214 from the sensors 81 and 83, in step 262 the stepper motor 168 is actuated to adjust the relative grinding burr position according to the grind setting that was selected during step 240. After the adjustment has been made, in step 264 a grind clock is started to time the period of grinding and in step 266 the grinding operation is started by energizing the rotary drive motor 154. The grind clock is internal to the microprocessor 202 and provides an elapsed time indication. During the grinding operation, the display shows the message, "THANK YOU. PLEASE WAIT FOR GRINDING TO FINISH".

If in step 270, it is determined that he grinding operation is completed, as indicated drive motor load sensor 216, then the grinding operation is ended in step 272. If not, but it is determined in step 274 that the maximum grind time, as measured by the grind time clock 264, has lapsed, then again the program proceeds to step 272 to end the grinding operation. Since finer grinds generally take longer than coarser grinds, a potentially different maximum grind time for each of the different grind settings may be stored in a the parameter and input data memory. After step 272, in step 275, the message "IT IS NOW SAFE TO REMOVE YOUR BAG" is shown to the user who may then remove the bag. Once it is determined that the bag has been removed in step 276, in step 278, the program returns to start 224, FIG. 6A.

While a particular embodiment has been disclosed in detail, it should be appreciated that many variations may be made without departing from the spirit and scope of the invention as defined in the appended claims.

The invention claimed is:

1. A food ingredient grinder, comprising:
  a grinding chamber with an electrically powered grinding mechanism for grinding food ingredient contained within the grinding chamber and passing the ground ingredient to an underlying ingredient container;
  an ingredient hopper having a hollow body for temporarily storing unground ingredient with
    an outlet for passing unground food ingredient to the grinding chamber, and
    an open top for receipt of food ingredient into the hopper;
  a cover mounted to the hopper for movement between a closed position in which the cover closes the open top and an open position in which the open top is uncovered to enable receipt of unground ingredient; and
  means for automatically moving the cover between the closed position and the open position.

2. The grinder of claim 1 including a cover sensing means including at least one of (a) a magnetic sensor, (b) an electromechanical switch engagable by a member that moves with the cover and (c) a photosensor.

3. The grinder of claim 1 in which
  the hopper cover is pivotally mounted to the hopper to rotate between the closed position and the open position, and including
  a cover sensing means for detecting the angular position of the cover relative to the open top of the cover.

4. The grinder of claim 1 including
  a cover sensor for sensing when the cover is not in the closed position;
  an electrical start switch connected to the electrical grinding mechanism, said start switch, when actuated, normally applying power to the grinding mechanism to begin a grinding operation; and
  a controller responsive to the cover sensor failing, to sense the cover in the closed position to disable the start switch from applying electrical power to the grinding mechanism in response to actuation of the start switch.

5. The grinder of claim 1 including
  a frame with a frame member upon which both the grinding chamber and the hopper are supported, and
  said automatically moving means includes an elongate member mechanically linked to the cover and releasably connected with a pushing mechanism to push upwardly on the elongate member to swivel the cover to an open position.

6. The grinder of claim 5 including as resilient member continually applying a resilient downward force on the cover to swivel it downwardly to a closed position, said downward resilient force being overcome when the pushing mechanism is being pushed upwardly to open the cover.

7. The grinder of claim 1 including
  an electronic controller for controlling the automatic moving means,
  an electronic alphanumeric display connected to the controller, and in which
  the controller selectively displays messages related, to the opening of the cover with respect to loading of ingredient into the ingredient hopper.

8. The grinder of claim 1 including
  an electronic controller for controlling the automatic moving means and a start switch,
  an electronic alphanumeric display connected to the controller, and in which
  the controller selectively displays messages related to the closing of the cover with respect to actuation of the start switch.

9. The grinder of claim 1 in which the automatically moving means includes one of
  (a) a rotary servomotor linked to the hopper and to the cover to pivot the cover between the open position and the closed position; and
  (b) an electromechanical device with a reciprocal drive member linked to the cover to pivot the cover between the open position and the closed position.

10. The grinder of claim 1 including an automatic control system including
  an electronic controller,
  a cover position sensor connected with the controller and sensing whether the cover is in an open or closed position,
  a container sensor connected with the controller and sensing, whether a container is in a position beneath the grinding chamber to accept receipt of ground food ingredient,
  a manually actuatable start switch for selectively connecting electrical power to the grinding mechanism,
  a display connected with the controller for displaying directional messages to a user used on information received by the controller from the cover position sensor, the container sensor and the manually actuatable start switch.

11. The grinder of claim 10 in which the controller includes
  a timer responsive to the start switch being actuated to apply electrical power to the electrically powered grinding mechanism for a preselected amount of time,
  said controller causing the display to indicate to the user that grinding is complete at the end of sais preselected time period.

* * * * *